(12) United States Patent
Koops

(10) Patent No.: US 7,846,012 B2
(45) Date of Patent: Dec. 7, 2010

(54) APPARATUS AND METHOD FOR STUNNING POULTRY

(75) Inventor: Hendricus Koops, Ede (NL)

(73) Assignee: Rico Research B.V., Wormer (NL)

( * ) Notice: Subject to any disclaimer, the term of this patent is extended or adjusted under 35 U.S.C. 154(b) by 359 days.

(21) Appl. No.: 11/956,510

(22) Filed: Dec. 14, 2007

(65) Prior Publication Data

US 2008/0176499 A1 Jul. 24, 2008

(30) Foreign Application Priority Data

Dec. 15, 2006 (EP) ................... 06126239
Dec. 18, 2006 (EP) ................... 06126337

(51) Int. Cl.
*A22B 3/06* (2006.01)

(52) U.S. Cl. ............................................... 452/58

(58) Field of Classification Search ............. 452/57–59, 452/141
See application file for complete search history.

(56) References Cited

U.S. PATENT DOCUMENTS

| | | | | |
|---|---|---|---|---|
| 1,935,138 A * | 11/1933 | Windisch | ..................... | 452/58 |
| 2,544,681 A | 3/1951 | Harsham et al. | .............. | 426/55 |
| 2,977,627 A * | 4/1961 | Morse et al. | ................... | 452/60 |
| 3,167,809 A * | 2/1965 | Rollins | ......................... | 452/60 |
| 3,258,811 A * | 7/1966 | Braun | ......................... | 452/60 |
| 3,702,017 A * | 11/1972 | Lewis | .......................... | 452/59 |
| 3,828,397 A * | 8/1974 | Harben, Jr. | ................... | 452/59 |
| 4,031,591 A * | 6/1977 | Collins | ......................... | 452/60 |
| 4,153,971 A | 5/1979 | Simonds | | |
| 4,221,021 A | 9/1980 | Swilley | ...................... | 452/141 |
| 4,340,993 A | 7/1982 | Cook | ......................... | 452/141 |
| 4,358,872 A | 11/1982 | VanZandt | ................... | 452/141 |
| 4,716,625 A * | 1/1988 | Nijhuis | ........................ | 452/60 |
| 5,299,976 A | 4/1994 | Meyn | | |
| 5,643,072 A | 7/1997 | Lankhaar et al. | ............. | 452/66 |
| 5,899,802 A | 5/1999 | Burnett | ...................... | 452/141 |
| 5,954,572 A * | 9/1999 | Kettlewell et al. | ............ | 452/58 |
| 2006/0135053 A1 | 6/2006 | Koops | | |
| 2007/0072532 A1 | 3/2007 | Koops | | |

FOREIGN PATENT DOCUMENTS

EP  1665935  12/2004
GB  2302639  1/1997

OTHER PUBLICATIONS

Submitted herewith is a an Official Search Report of the European Patent Office in counterpart foreign application No. EP 06126337 filed Dec. 18, 2006.
Submitted herewith is a an Official Search Report of the European Patent Office in counterpart foreign application No. EP 06126239 filed Dec. 15, 2006.

* cited by examiner

*Primary Examiner*—Thomas Price
(74) *Attorney, Agent, or Firm*—Steven M. Koehler; Westman, Champlin & Kelly, P.A.

(57) ABSTRACT

An apparatus for stunning poultry is provided, comprising a power source, a first electrode connected to a first pole of the power source for engaging the head of the poultry and a second electrode connected to the opposite pole of the power source for externally engaging a groin area, except any part of a vent, of the poultry.

27 Claims, 2 Drawing Sheets

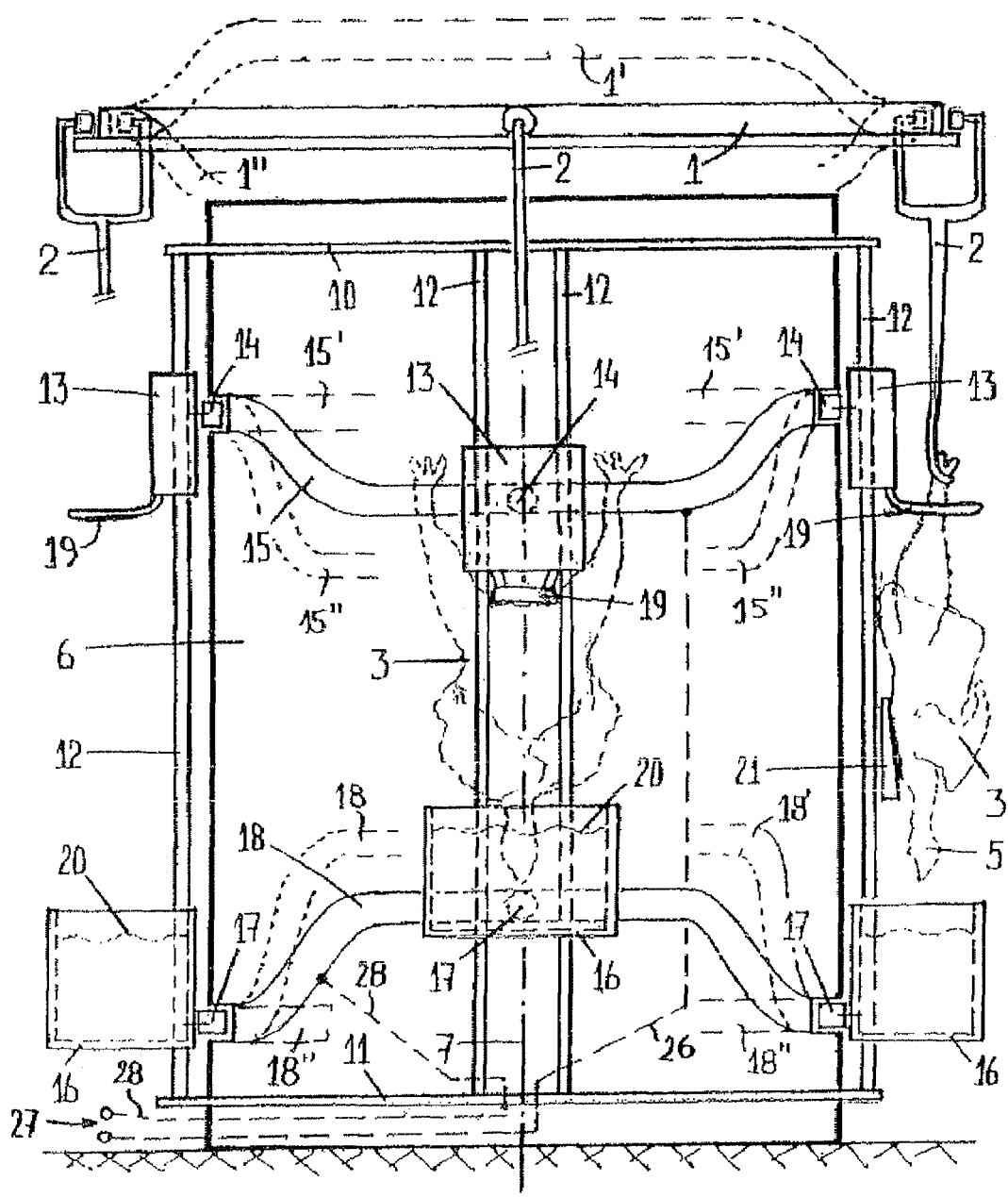
Fig.1
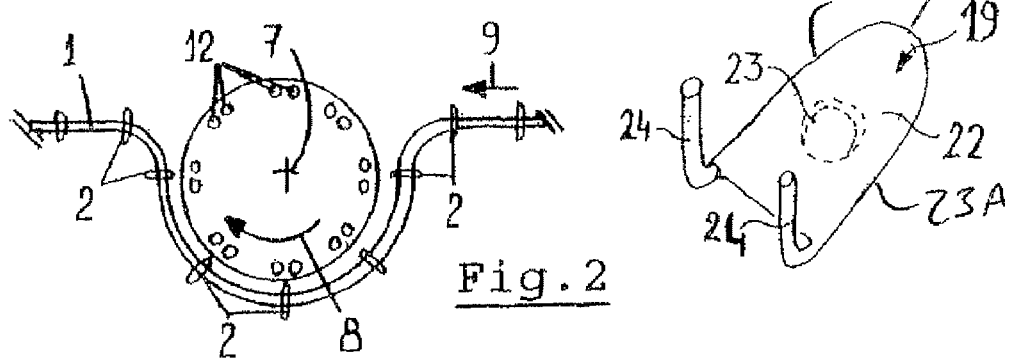
Fig.2
Fig.3

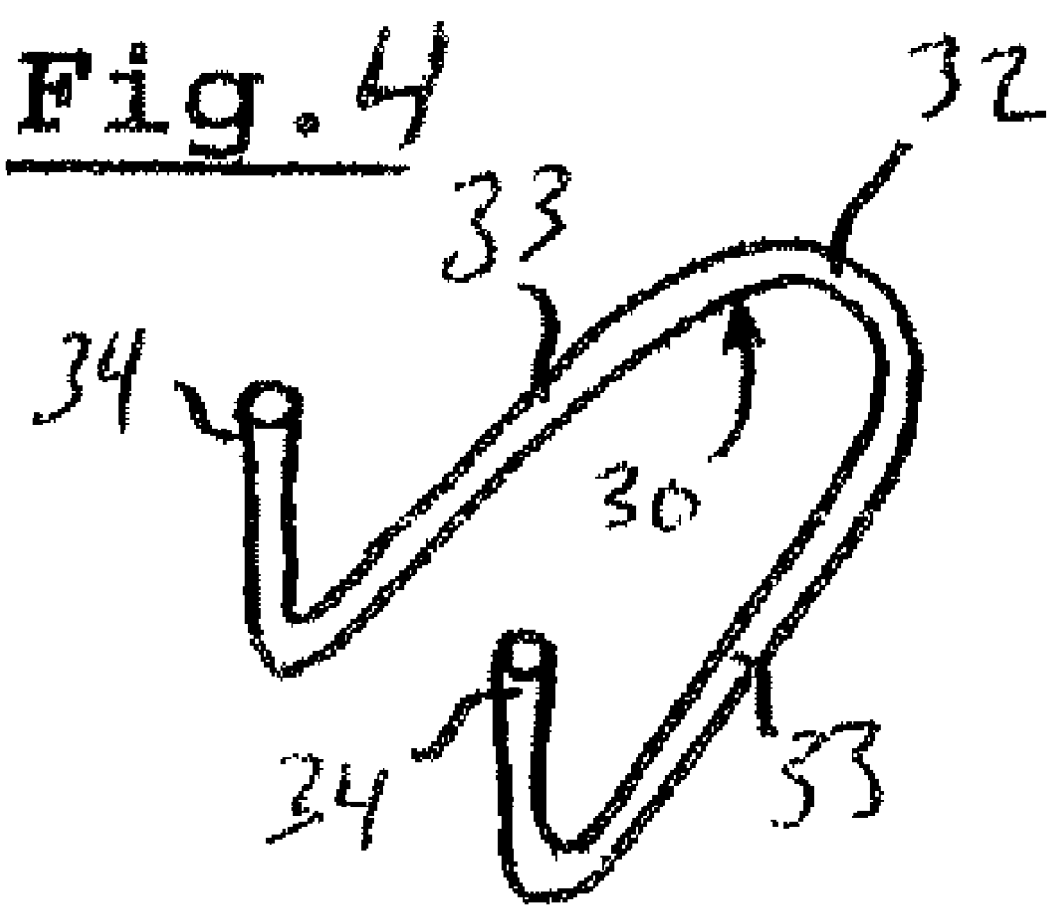

APPARATUS AND METHOD FOR STUNNING POULTRY

BACKGROUND

The discussion below is merely provided for general background information and is not intended to be used as an aid in determining the scope of the claimed subject matter.

Aspects of the invention relate to an apparatus and method for stunning poultry comprising a power source, a first device connected to a first pole of the power source for engaging the head of the poultry and a second device connected to the opposite pole of the power source for engaging another body part of the poultry. Improvements in such machines and methods are always needed in order to process poultry efficiently.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

In accordance with an aspect of the present invention, an apparatus for stunning poultry includes an electrode for externally engaging the groin region, except any part of a vent, of the poultry.

It is believed that the skin at the groin region of the poultry is more conductive then at the legs, such that an excellent conduction of the electric current from the electrode towards the poultry will occur. However, not only will the conductivity be increased over that of the legs, but it also will be more stable among a series of poultry, such that the conductivity can be predicted more precisely. The result is, that a more precise setting of the voltage between the first and second pole of the power source can be chosen, leading to reproducible results.

If desired, the electrode can be configured to also spread the legs of the poultry. Use of the electrode to also spread or engage the legs is very advantageous, because such an electrode can function as a brace for positioning and stabilising the poultry during many stages of the processing. It has been known to use a brace having spaced apart, elongate rod portions for this stabilization purpose; however it has been discovered that a brace having such an elongate rod portion (and in one advantageous embodiment, two spaced apart elongate rod portions so as to contact separate portions of the groin area on opposite sides of a centerline of the poultry) can function as an electrode to engage the groin region of the poultry.

In one embodiment, the electrode is substantially U-shaped with two outer parts connected by a curved top, wherein said outer parts are intended to engage the poultry at the groin region on opposite sides of the centerline of the poultry. This shape of the brace not only efficiently spreads the legs, but also provides predictable conductivity in order to stun the poultry (probably because it provides a firm contact between its outer parts and the groin region of the poultry).

In a further embodiment, the electrode is substantially plate-shaped. In other words, the electrode includes a portion that has substantial two-dimensional (although not necessarily flat) area so to engage a relatively large area of the groin region of the poultry, for example, a majority of the region.

However, it is possible too that the plate-shaped electrode includes a central hole to be positioned at the vent of the poultry. Thus, although contact results over a relatively large area in the groin region, such contact is prevented at the vent itself. It should be noted, as used herein, "externally engaging the groin region," or variances thereof, also means external to any part of the vent of the poultry.

In yet a further embodiment, the dimensions of the electrode are such that, during "stunning" of the poultry, it remains free from the legs of the poultry.

Secondly, an aspect of the invention relates to a method for stunning poultry. The method for stunning poultry includes electrically connecting a head of the poultry to a first pole of a power source and connecting external portions of the groin region, except any part of a vent, of the poultry to a second pole of the power source.

In one embodiment of the method for stunning poultry, connecting the second pole of the power source includes using an electrode that is configured to spread the legs apart. If desired, stunning can be performed to the region surrounding, but not including the vent and/or the legs of the poultry.

BRIEF DESCRIPTION OF THE DRAWINGS

Hereinafter aspects of the invention will be elucidated while referring to the drawing, in which an embodiment of the apparatus according to the present invention is illustrated.

FIG. 1 schematically illustrates a side elevational view of an embodiment of the apparatus.

FIG. 2 illustrates, on a reduced scale and extremely schematically, a top plan view.

FIG. 3 illustrates on an enlarged scale an electrode.

FIG. 4 illustrates on an enlarged scale yet another electrode.

DETAILED DESCRIPTION OF THE ILLUSTRATIVE EMBODIMENT

Firstly referring to FIG. 1, an embodiment of an apparatus for stunning poultry is illustrated which is meant for cooperation with a suspension conveyor 1. Such a suspension conveyor, which is known per se, comprises shackles 2 from which poultry 3 is suspended from their legs 4. That means that the head 5 of the poultry 3 is directed downwards.

In the illustrated embodiment the apparatus comprises a rotating carousel-like device which is provided with a stationary core 6. In a manner not illustrated in detail, this stationary core 6 carries a frame which can be rotated around a central axis 7. In FIG. 2 the direction of rotation of the frame around the central axis 7 has been indicated by arrow 8. Likewise, the direction of travel of the suspension conveyor 1 has been indicated by arrow 9. As illustrated, the suspension conveyor 9 partly encircles the carousel-like device.

Again referring to FIG. 1, the frame of the carousel-like device comprises an upper support plate 10 and a lower support plate 11. Between these support plates 10 and 11 are guide mechanisms herein illustrated as pairs of guiding rods 12 that extend vertically. As illustrated clearly in FIG. 2, a number of said pairs of guiding rods 12 is spaced at regular intervals along the circumference of the carousel-like device. In the embodiment illustrated schematically in FIG. 2 eight of such pairs are provided; in FIG. 1, however, some of these pairs have been omitted for simplifying the drawing.

The guiding rods 12 illustrated in FIG. 1 at the right-hand side correspond with the guiding rods 12 at the three o'clock position in FIG. 2; likewise the guiding rods 12 positioned centrally in FIG. 1 correspond with the guiding rods at the six o'clock position in FIG. 2, whereas the guiding rods 12 at the left-hand position in FIG. 1 correspond with the nine o'clock position in FIG. 2.

The guide mechanisms, herein each pair of guiding rods 12, firstly carries an upper sliding block 13 which carries a follower roll 14 that cooperates with a stationary curve 15 in the stationary core 6. Further each pair of guiding rods 12 carries a second sliding block 16 which carries guide element herein a follower roll 17 that cooperates with a stationary curve 18 in the stationery core 6.

The upper sliding block 13 carries an electrode 19 used to engage a region of the poultry proximate the groin. In a further embodiment, the electrode 19 is configured with side edges 23A spaced apart and of size and shape so as to engage the legs of the poultry in order to stabilize the poultry during processing and/or cause spreading of the legs with relative motion between the electrode and the legs, or prior to engagement of the electrode with the groin region. The side edges 23A can converge as illustrated so as to form a narrower end portion 23B that aids in inserting the electrode 19 between the legs of the poultry 3.

In the illustrative embodiment, the guide mechanism further supports a lower sliding block 16 that is shaped as a liquid container containing a conductive fluid 20. The liquid container and fluid 20 comprises another electrode for the stunning process. Like the electrode 19, the liquid container and fluid 20 can be movable relative to the poultry 3. For instance, a guide element, follow roll 17, can be guided in a stationary curve 18 in a manner similar to that of roll 14 and curve 15.

The curve 15, roll 14, sliding block 13 and electrode 19 are made of a conductive material, such that through line 26 the plate-shaped electrode 19 is connected to a first pole of the power source 27 (represented herein by end terminals), for instance, the negative pole of the power source 27. Likewise, the conductive fluid 20 is connected to the opposite pole (for instance, the positive pole) of the power source 27 through line 28, curve 18, roll 17 and sliding block 16.

In operation poultry 3, which is conveyed by the suspension conveyor 1, reaches the carousel-like device at the three o'clock position illustrated in FIG. 2. As shown in FIG. 1, in this position (right-hand side) the upper sliding block 13 is at a high position, in which the electrode 19 does not engage the poultry 3 at the groin region yet (it is noted however that the electrode can be already positioned between the legs of the poultry 3). Likewise the lower sliding block (liquid container and fluid 20) 16 is in a low position, in which the head 5 of the poultry 3 is above the conductive liquid 20.

When the frame of the device rotates as indicated by arrow 8 in FIG. 2, the follower rolls 14 and 17 of the sliding blocks 13 and 16, respectively, will follow the respective stationary curves 15 and 18, respectively, and will move downwardly and upwardly, respectively, to the positions illustrated in FIG. 1 in the central location. In these positions the electrode 19 has contacted the groin region of the poultry 3, and the head 5 of the poultry is submerged in the conductive fluid 20 in the liquid container 16. Now the power source 27 is activated and an electrical current runs through the body of the poultry, stunning the bird.

During continued rotation of the device the upper sliding block 13 again will move to its high position, whereas the liquid container 16 will move towards its low position, in which the bird 3 again is free and wherein there is no contact anymore between the electrode 19 and groin region of the poultry (in FIG. 1 the bird has not been illustrated in this location, but it will assume a position which corresponds with the position illustrated at the right-hand side of the figure).

Each successive bird arriving along the suspension conveyor 1 will be processed in this manner.

It is also possible that the poultry is movable upwards and downwards through an appropriate shape of the suspension conveyor 1 rather than the electrode 19 and/or container 16. The shape 1' thereof than will correspond with the shape 15' of the upper curve and shape 18' of the lower curve to obtain the appropriate relative movements between the poultry 3, electrode 19 and container 16. Likewise the shape 1" thereof will correspond with the shape 15" of the upper curve and shape 18" of the lower curve.

In FIG. 1 further supports 21 have been illustrated schematically, which serve for locating and maintaining the poultry 3 in a correct position. Such supports may be stationary, but also can be movable, for example under influence of the cooperation between curves and/or follower rolls.

FIG. 3 shows a perspective view of the electrode 19. It comprises two connecting rods 24 which are to be connected to the sliding block 13 (although any other manner of connection is possible too). A central region 22 is plate-shaped (although not necessarily flat) to achieve a large contact area (e.g. majority) with the groin region of poultry. In an alternative embodiment said central region 22 is provided with a central hole 23 (illustrated in dotted lines) to be positioned at the vent of the poultry so that contact is not made with the vent.

FIG. 4 illustrates another electrode 30. Electrode 30 comprises a conductive, elongate rod that is bent into a U-shaped configuration, such that the forward end defines a curved top or narrower end 32 connecting two outer parts 33 that converge. Said outer parts 33 are intended to externally engage the poultry at the groin region, except any part of a vent. The ends 34 of the outer parts 23 will be attached to the sliding block 13 and thus power source 27. Like electrode 19, electrode 30 can be configured so as to separate the legs yet provide firm contact with the poultry 3, maintaining it in stable positions during processing.

In another embodiment not illustrated, the poultry is oriented horizontally during the stunning process, for example supported at its chest or back (e.g. by a support similar to the support 21, but oriented horizontally).

Although the subject matter has been described in language specific to structural features and/or methodological acts, it is to be understood that the subject matter defined in the appended claims is not necessarily limited to the specific features or acts described above as has been determined by the courts Rather, the specific features and acts described above are disclosed as example forms of implementing the claims.

What is claimed is:

1. An apparatus for stunning poultry, comprising a power source, a first electrode connected to a first pole of the power source and configured to engage a head of the poultry and a second electrode connected to the opposite pole of the power source and configured to externally engage a groin region, except any part of a vent, of the poultry, and wherein the second electrode is configured to engage said groin region with electrically conductive portions on at least opposite sides of a centerline of the poultry.

2. The apparatus of claim 1 wherein the second electrode is configured to engage said groin region with the electrically conductive portions away from but on opposite sides of the vent of the poultry.

3. The apparatus of claim 2 wherein the electrically conductive portions comprise spaced apart elongate rod portions.

4. The apparatus according to claim 2, wherein the electrically conductive portions are part of a plate-shaped portion configured to engage said groin region of the poultry.

5. The apparatus according to claim 4, wherein the plate-shaped portion includes a central hole to be positioned at the vent of the poultry.

6. The apparatus according to claim 1 wherein dimensions of the second electrode are such that, during use, it remains free from the legs of the poultry.

7. The apparatus according to claim 1 and further comprising a device configured to suspend and transport the poultry from the legs.

8. The apparatus according to claim 7 wherein the device comprises a suspension conveyor configured to convey the poultry while suspended from the legs, and further comprising a rotating carousel-like device which carries at regular intervals along its circumference a number of second electrodes for spreading the legs of the poultry, wherein the rotating carousel-like device is configured to provide a relative upward and downward movement of the second electrodes relative to poultry suspended from the suspension conveyor when the suspension conveyor conveys the poultry around part of the circumference of the carousel-like device in coordination with the rotation of the carousel-like device.

9. The apparatus according to claim 8, wherein the second electrodes are configured to move upwards and downwards along respective guides attached to the carousel-like device through the cooperation between a stationary curve and a movable follower attached to the second electrodes.

10. The apparatus according to claim 8, wherein the second electrodes have a stationary vertical position and wherein the suspension conveyor has successive sloping parts for moving the poultry upwards and downwards relative to the second electrodes.

11. The apparatus according to claim 1 and further comprising a support for supporting a breast or back of the poultry in a substantially vertical position.

12. The apparatus according to claim 1, wherein the first electrode comprises an electrically conductive liquid in which the head of the poultry is to be submerged, and wherein the liquid is contained in a number of successive containers, such that during operation of the apparatus each separate container will receive only one poultry head sequentially.

13. The apparatus according to claim 12 and further comprising a rotating carousel-like device which carries at regular intervals along its circumference a number of liquid containers and is configured such that a relative upward and downward movement between the containers and the poultry occurs when the suspension conveyor conveys the poultry around part of the circumference of the carousel-like device.

14. The apparatus according to claim 13, wherein the liquid containers are configured to move upwards and downwards along respective guides attached to the carousel-like device through the cooperation between a stationary curve and movable follower attached to the liquid containers.

15. The apparatus according to claim 14, wherein the liquid containers have a stationary vertical position and wherein the suspension conveyor has successive sloping parts for moving the poultry upwards and downwards relative to the liquid containers.

16. In combination with at least one poultry, an apparatus for stunning the poultry, comprising:
a power source having two poles; and
an electrode electrically connected to one of the two poles, the pole being of size so as to externally engage a groin region, except any part of a vent, of the at least one poultry, and wherein the electrode includes spaced apart electrically conductive portions configured to engage said groin region on opposite sides of a centerline of the poultry.

17. The combination of claim 16, wherein the apparatus further comprises:
a conveyor, wherein the poultry is attached to the conveyor, and
a mechanism configured to provide relative movement between the electrode and said groin region of the poultry to insert and withdraw the electrode with respect to said groin region as the conveyor conveys the poultry through the apparatus.

18. The combination of claim 17 wherein the electrode is configured to engage said groin region with the spaced apart electrically conductive portions away from but on opposite sides of the vent of the poultry.

19. The combination of claim 18 wherein the spaced apart electrically conductive portions comprise spaced apart elongate rod portions.

20. The combination according to claim 18, wherein the spaced apart electrically conductive portions are on opposite sides of a plate-shaped portion configured to engage said groin region of the poultry.

21. The combination according to claim 20, wherein the plate-shaped portion includes a central hole to be positioned at the vent of the poultry.

22. The combination according to claim 17 wherein dimensions of the electrode are such that, during use, it remains free from the legs of the poultry.

23. An apparatus for stunning poultry, comprising a power source, a first electrode connected to a first pole of the power source and configured to engage a head of the poultry and a second electrode connected to the opposite pole of the power source and configured to externally engage a groin region, except any part of a vent, of the poultry, and wherein the second electrode includes electrically conductive portions configured to engage an outer surface of the groin region in an elongated manner on opposite sides of the centerline of the poultry.

24. The apparatus of claim 23 wherein the second electrode is configured to engage said groin region with the elongated electrically conductive portions away from but on opposite sides of the vent of the poultry.

25. The combination of claim 24 wherein the spaced apart electrically conductive portions comprise spaced apart elongate rod portions.

26. The combination according to claim 24, wherein the spaced apart electrically conductive portions are opposite sides of a plate-shaped portion configured to engage said groin region of the poultry.

27. The combination according to claim 26, wherein the plate-shaped portion includes a central hole to be positioned at the vent of the poultry.

* * * * *